Dec. 29, 1925.
1,567,764
J. SLEPIAN
RADIORECEPTION
Filed April 21, 1921
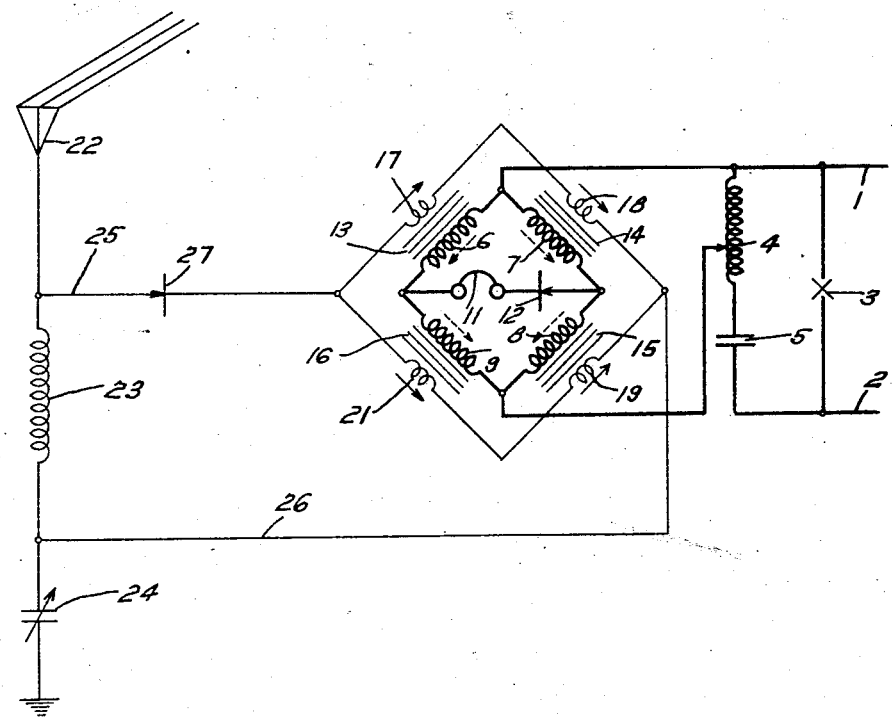
WITNESSES:
INVENTOR
Joseph Slepian.
BY Patented Dec. 29, 1925.

1,567,764

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

RADIORECEPTION.

Application filed April 21, 1921. Serial No. 463,205.

To all whom it may concern:

Be it known that I, JOSEPH SLEPIAN, a citizen of the United States, and a resident of Wilkinsburg, in the county of Allegheny and State of Pennsylvania, have invented a new and useful Improvement in Radioreception, of which the following is a specification.

My invention relates to a system for the amplification of received signal current and more particularly it relates to the amplification of received signal current in radio telephony.

An object of my invention is to provide a system for the amplification of signal current in which the signal current operates to change the amount of unbalancing in a plurality of directions in a Wheatstone bridge across a diagonal of which a local source of high-frequency alternating current is connected.

Another object of my invention is to provide a system utilizing the saturation properties of iron to produce a greatly amplified unbalancing effect in a plurality of directions in a Wheatstone bridge.

For the amplification of current effects, such as received signal current, amplifier vacuum tubes are customarily employed. The receiving circuits for the use of vacuum tubes as amplifiers comprise plate and filament batteries and a grid battery or a grid-leak resistance and a condenser. These various elements, together with the means for coupling the circuits, greatly complicate the receiving system. The vacuum tubes are delicate and often break, particularly when subjected to sudden shocks and jars. When vacuum-tube amplifiers are used in places where the apparatus is subjected to heavy jolting, as, for instance, in fighting tanks or aeroplanes, it is necessary, at frequent intervals, to replace them. Even under the most ideal conditions, the life of vacuum tubes is comparatively limited.

In my invention, a source of high-frequency alternating current is connected across a diagonal of a Wheatstone bridge having inductive windings in the arms. Means for detecting unbalancing of the bridge is connected across the other diagonal of the bridge, and I have shown, for this purpose, telephone receivers connected in series with a rectifier. The inductance coils are wound upon iron cores, and the rectified signal current flows through other inductance coils, likewise wound upon the iron cores.

The inductance devices in the Wheatstone bridge through which the current from the high-frequency source flows are so adjusted that the iron cores are magnetized close to the knee of the saturation curve. When no signal current is being received, the inductance coils, with their iron cores, offer a relatively large impedance to the passage of the alternating current. However, when signal current is received, such current, by reason of the connection of the signal-current circuit, produces a magnetization in opposite directions in the iron cores in adjacent inductance devices of the Wheatstone bridge, and, because the iron cores are operating near the knee of the saturation curve, the inductance is decreased in one arm of the bridge and, at the same time, it is increased in the next adjacent arm.

The higher the frequency of the local alternating current the greater the change in the power associated with the unbalance of the bridge for any given change in inductance. Consequently, a greater amplification is secured by the employment of a local source of current of very high frequency.

In the drawings, the single figure is a diagrammatic view of apparatus and circuits embodying one form of my amplifying system.

In the drawing, I have shown power mains 1 and 2, across which is connected an arc oscillator 3. The arc 3 is located in a tuned oscillating circuit comprising an inductance coil 4 and a condenser 5. Though I have shown an arc and a tuned circuit for producing a high-frequency input to my system, it is to be distinctly understood that a high-frequency alternator, a vacuum-tube oscillator, or any of the other well known generators of high-frequency currents may be employed.

Across all or a portion of the inductance coil 4 is connected a diagonal of a Wheatstone bridge having inductance windings 6, 7, 8 and 9 in the respective arms thereof. Connected across the other diagonal of the bridge, are telephone receivers 11 in series with a rectifier 12.

The inductance coils 6, 7, 8 and 9 are wound, respectively, on iron cores 13, 14, 15 and 16, which are preferably of small dimensions. To vary the magnetization of the iron cores 13, 14, 15 and 16, I have shown primary inductance windings 17, 18, 19 and 21, respectively, connected in the arms of a second Wheatstone bridge. The diagonal of the second bridge, which corresponds to the second-mentioned diagonal of the first bridge, is adapted to receive the rectified signal-current input.

To provide the rectified signal-current input I have shown an antenna system comprising an antenna 22, an inductance device 23 and a variable condenser 24, from whence the system is connected to ground. By varying the variable condenser 24 the antenna circuit may be tuned to any desired frequency. Conductively coupled to the inductance coil 23, are leads 25 and 26 which connect across the second Wheatstone bridge. To make the signal-current input unidirectional, I have shown a rectifier 27.

The first mentioned bridge is normally balanced, and the applied voltage is preferably so adjusted that the cores 13, 14, 15 and 16 of the inductance devices 6, 7, 8 and 9, respectively, operate close to the knee of the saturation curve. By reason of the high permeability of the iron cores, the impedances of the inductance devices are much larger than would be the case were they operating with air cores.

For a thorough understanding of the principles of my invention, reference is made to the drawing which shows the direction of the flow of currents in my bridge arrangements. The rectified signal current flows in the direction of the full-line arrows. The high-frequency input current flows in the direction of the dotted arrows during one half cycle. The alternating-current input in one arm tends to magnetize the iron core in a direction opposing that of the signal-current input, while, in the next adjacent arm, the magnetization produced by the two currents is in the same direction. This results in a change in the balancing of the bridge. During the other half cycle of the local high-frequency current, there is a similar change in the balancing in the opposite direction.

Since the cores are operating near the knee of the saturation curve, the effect of the signal currents in adjacent inductance devices is to cause a distortion of the flux curves in opposite senses, whereby a multiplied unbalancing effect is produced in the Wheatstone bridge, and a difference in potential is produced between the points across which the telephone receivers 11 and the rectifier 12 are connected.

The local high-frequency alternations employed are preferably above the range of audibility, and hence, voice-modulated currents or other modulated radio signals may be received and reproduced in the telephone receivers 11. If the alternating-current input from the local alternating-current source is within the range of audibility, undamped wave trains may be detected in radio telegraphy by my system, either with or without the rectifier 12 in series with the receivers 11, since unbalancing produces an audible note. An audible note may also be obtained with my system by omitting the signal-current rectifier 27, and heterodyning the radio-frequency signal currents with a local radio-frequency source, or, if the full amplification possibilities are to be realized, the rectifier 27 may be retained to rectify the modulated current from the local source.

In my invention, I have utilized the saturation properties of iron to effect an amplification of received signals. By employing iron cored elements in the arms of a Wheatstone bridge which are acted upon in different directions by the signal current, I produce a multiplied amplification of the unbalancing effect, whereby great amplification of the signal current is produced.

Since I have not shown all the possible modifications of my invention which may be suggested by one skilled in the art, I desire that my invention shall be limited only by the appended claims and by the prior art.

I claim as my invention:

1. A magnetic amplifier of modulated high-frequency currents and oscillations comprising a Wheatstone bridge, one arm of said bridge including a coil with an iron core, said bridge being normally balanced, and means associated with said core for producing saturation effects varying in accordance with said high-frequency currents, whereby said bridge is rendered unbalanced.

2. A system for amplifying signal currents, comprising a normally balanced Wheatstone bridge, a source of ultra-audiofrequency current connected in one diagonal thereof, means responsive to the signal currents for unbalancing said bridge, and means operatively associated with the other diagonal and responsive to the unbalanced condition of said bridge for producing an amplified signal-current effect.

3. In an amplifying system, the combination with a source of modulated ultra-audiofrequency signal-currents, of a normally balanced Wheatstone bridge, a source of ultra-audio-frequency current connected in one diagonal thereof, means responsive to the signal currents for unbalancing said bridge, and means operatively associated with the other diagonal and responsive to the unbalanced condition of said bridge for producing an amplified signal-current effect.

4. In an amplifying system, the combination with a source of ultra-audio-frequency signal-currents having audio-frequency modulations, of means for rectifying said signal-currents, a normally balanced Wheatstone bridge, a source of ultra-audio-frequency current connected in one diagonal thereof, means responsive to said rectified signal currents for unbalancing said bridge, and means operatively associated with the other diagonal and responsive to the unbalanced condition of said bridge for producing an amplified signal-current effect.

5. In an amplifying and detecting system, the combination with a source of ultra-audio-frequency signal-currents having audio-frequency modulations, of means for rectifying said signal-currents, a Wheatstone bridge, a local source of ultra-audio-frequency current connected across one diagonal of said bridge, and a rectifying device and a telephone receiver connected across the other diagonal of said bridge, said bridge including a variable impedance device in one or more arms thereof which is responsive to said rectified signal-currents.

6. A system for amplifying signal currents, comprising a circuit having a plurality of normally balanced arms, an iron-core inductance device of variable impedance included in one arm of said circuit, a source of ultra-audio-frequency current connected to said circuit, and means responsive to the signal currents for varying said impedance.

7. In an amplifying system, the combination with a source of unidirectional signal currents, of a circuit having a plurality of normally balanced arms, an iron-core inductance device of variable impedance included in one arm of said normally balanced circuit, a source of alternating current connected to said normally balanced circuit, and means for superimposing the magnetic effects of said unidirectional signal currents upon said inductance device.

8. In an amplifying system, the combination with a source of unidirectional signal currents, of a Wheatstone bridge, a local source of ultra-audio-frequency current connected across one diagonal of said bridge, and a rectifying device and a telephone receiver connected across the other diagonal of said bridge, said bridge including a variable impedance device in one or more arms thereof which is responsive to said rectified signal-currents.

9. In an amplifying system, the combination with a source of signal currents, of a Wheatstone bridge, a local source of ultra-audio-frequency current connected across one diagonal of said bridge, a rectifying device and a telephone receiver connected across the other diagonal of said bridge, said bridge including an iron-core inductance device in one or more arms thereof, and means for producing a variable degree of saturation in said inductance device in accordance with said signal currents.

10. In an amplifying system, the combination with a source of unidirectional signal currents, of a Wheatstone bridge, a local source of ultra-audio-frequency current connected across one diagonal of said bridge, a rectifying device and a telephone receiver connected across the other diagonal of said bridge, said bridge including an iron-core inductance device in one or more arms thereof, and means for superimposing the magnetic effects of said unidirectional signal currents upon said inductance device.

11. In an amplifying system, the combination with a source of unidirectional signal currents, of a circuit having a plurality of normally balanced arms, an iron-core inductance device of variable impedance included in one arm of said normally balanced circuit, a source of alternating current connected to said normally balanced circuit and energizing said inductance device near the knee of its degree of saturation curve, and means for superimposing the magnetic effects of said unidirectional signal currents upon said inductance device.

12. In an amplifying system, the combination with a source of unidirectional signal currents, of a Wheatstone bridge, a source of ultra-audio-frequency alternating current connected across one diagonal of said bridge, and a translating device connected across the other diagonal thereof, said bridge including a variable impedance device in one or more arms thereof, which is responsive to said unidirectional signal currents.

13. In an amplifying system, the combination with a source of signal currents, of a Wheatstone bridge, a source of ultra-audio-frequency alternating current connected across one diagonal of said bridge, a translating device connected across the other diagonal thereof, said bridge including an iron-core inductance device in one or more arms thereof, and means for producing a variable degree of saturation in said inductance device in accordance with said signal currents.

14. In an amplifying system, the combination with a source of unidirectional signal currents, of a Wheatstone bridge, a source of ultra-audio-frequency alternating current connected across one diagonal of said bridge, a translating device connected across the other diagonal thereof, said bridge including an iron-core inductance device in one or more arms thereof, and means for superimposing the magnetic effects of said unidirectional signal currents upon said inductance device.

15. A system for the amplification of received signal current comprising secondary windings located in the arms of a Wheatstone bridge, a local source of current connected across one diagonal of the bridge, means connected across the other diagonal for detecting a change in the unbalancing of the bridge, primary windings magnetically coupled to the secondary windings, and a source of unidirectional signal current flowing through the primary windings to effect a change in the balancing of the bridge.

16. A system for the amplification of received signal current comprising inductive windings in the arms of a Wheatstone bridge, a source of alternating current connected across one diagonal of the bridge, iron cores for the inductive windings, means operated by the signal current for producing magnetic effects in the iron cores whereby a change is effected in the balancing of the bridge, and means for detecting the change in the balancing.

17. A system for the amplification of received signal current comprising inductive windings in the arms of a Wheatstone bridge, a source of alternating current connected across one diagonal of the bridge, iron cores for the windings, means for changing the degree of saturation of the cores in accordance with received signals, and means for detecting a change in the balancing of the bridge.

18. A system for the amplification of received signal current comprising a Wheatstone bridge, a source of alternating current connected across a diagonal of the bridge, iron-core inductance devices located in the arms of the bridge, a source of signal current, means associated with the signal current for causing saturation effects in the inductance devices whereby a change is produced in the balancing of the bridge, and means for detecting the change in the balancing of the bridge.

19. A relay system comprising inductive windings connected to comprise the arms of a Wheatstone bridge, iron cores for the windings, a source of alternating current connected across one diagonal of the bridge, means connected across the other diagonal for detecting a change in the balancing of the bridge, a source of unidirectional signal current, and means operated by the signal current for producing magnetic effects in the iron cores whereby a change is effected in the balancing of the bridge.

20. A system for the amplification of received signal current comprising a Wheatstone bridge including inductive windings in the arms thereof, iron cores for the windings, a source of alternating current connected across one diagonal of the bridge, means connected across the other diagonal for detecting a change in the balancing of the bridge, a source of unidirectional signal-current, and inductive windings located in the signal-current circuit and wound on the iron cores to effect a change in the balancing of the bridge.

21. A system for the amplification of received radio telephonic signals comprising a Wheatstone bridge including inductive windings in the arms thereof, iron cores for the windings, a source of high-frequency alternating current connected across one diagonal of the bridge, a translating device connected across the other diagonal, a source of unidirectional signal current, and means operated by the signal current to produce magnetic effects in accordance with voice vibrations in the iron cores whereby the balancing of the bridge is correspondingly altered.

22. A system for the amplification of received radio telephonic signals comprising inductive windings in the arms of a Wheatstone bridge, iron cores for the windings, a source of high-frequency alternating current connected across one diagonal of the bridge, a source of unidirectional signal current, means operated by the signal current to produce magnetic effects in accordance with voice vibrations in the iron cores whereby the balancing of the bridge is correspondingly altered, telephone receivers connected across the other diagonal, and a rectifier in circuit with the telephone receivers.

23. A relay system, comprising a Wheatstone bridge, a source of high-frequency alternating current connected across one diagonal of the bridge, iron-core impedance means connected in the arms of the bridge, a source of voice-modulated radio-frequency signal current, a rectifier in circuit therewith, means associated with the rectified signal current for causing saturation effects in the impedance means, whereby the bridge is unbalanced in accordance with voice vibrations, and means for detecting the changes in the balancing of the bridge.

24. A relay system, comprising inductive windings in the arms of a Wheatstone bridge, iron cores for the windings, a source of alternating current connected across one diagonal of the bridge, means for detecting unbalanced conditions of the bridge connected across the other diagonal, a source of uni-directional signal current, and inductive windings located in the signal-current circuit and wound on the iron cores to effect unbalancing of the bridge.

25. An amplifying device comprising four iron-core transformers having primary windings connected in the arms of a Wheatstone bridge and having secondary windings connected in series in pairs.

26. An amplifying device comprising four iron-core transformers having primary windings connected in the arms of a Wheatstone bridge and having secondary windings connected in the arms of a quadrilateral closed circuit, an alternating-current source of energy connected across one diagonal of said bridge, a translating device connected across the other diagonal of the bridge, and a modulating circuit connected across a diagonal of said quadrilateral closed circuit corresponding to the diagonal containing said translating device.

In testimony whereof, I have hereunto subscribed my name this 14th day of April 1921.

JOSEPH SLEPIAN.